United States Patent
Hendel et al.

(10) Patent No.: US 11,583,985 B2
(45) Date of Patent: Feb. 21, 2023

(54) COMBINATION TOOL FOR TENSIONED FASTENERS

(71) Applicants: Tomer Hendel, Santa Monica, CA (US); Todd Haroutunian, Santa Monica, CA (US)

(72) Inventors: Tomer Hendel, Santa Monica, CA (US); Todd Haroutunian, Santa Monica, CA (US)

( * ) Notice: Subject to any disclaimer, the term of this patent is extended or adjusted under 35 U.S.C. 154(b) by 397 days.

(21) Appl. No.: 16/776,495

(22) Filed: Jan. 29, 2020

(65) Prior Publication Data
US 2020/0238490 A1 Jul. 30, 2020

Related U.S. Application Data

(60) Provisional application No. 62/798,749, filed on Jan. 30, 2019.

(51) Int. Cl.
*G01B 3/22* (2006.01)
*B25B 29/02* (2006.01)
*G01B 7/02* (2006.01)

(52) U.S. Cl.
CPC .............. *B25B 29/02* (2013.01); *G01B 7/023* (2013.01)

(58) Field of Classification Search
CPC ...... B25B 29/02; B25B 23/1425; G01D 5/04; G01B 7/023; G01B 3/22; G01B 3/28
See application file for complete search history.

(56) References Cited

U.S. PATENT DOCUMENTS

| | | | | |
|---|---|---|---|---|
| 3,650,016 A | * | 3/1972 | McMaster | B25B 21/00 81/463 |
| 5,189,796 A | * | 3/1993 | Ginggen | G01B 3/46 33/DIG. 6 |
| 2007/0214675 A1 | * | 9/2007 | Weissinger | G01B 3/18 33/813 |
| 2017/0314903 A1 | * | 11/2017 | Ooura | G01D 5/26 |

* cited by examiner

*Primary Examiner* — Lee E Rodak
*Assistant Examiner* — Brent J Andrews
(74) *Attorney, Agent, or Firm* — One LLP

(57) ABSTRACT

An apparatus for tensioning a fastener while measuring displacement of the fastener relative to a female threaded member may include a driver extension having an interior channel aligned along the extension's central cylindrical axis, open to a socket driver at an output end of the driver. The apparatus may further include a measurement probe in the interior channel, coupled to a measurement indicator on an exterior of the extension by a coupling that moves the measurement indicator in proportion to movement of the measurement probe and a measurement gauge coupled to an exterior of the driver extension that gauges displacement of the measurement indicator. A method for using the apparatus includes driving a female threaded member along a threaded rod by the driver extension while holding the measurement probe against an end of a bolt, screw, or other threaded fastener of which the threaded rod forms a part and while reading the measurement gauge.

19 Claims, 9 Drawing Sheets

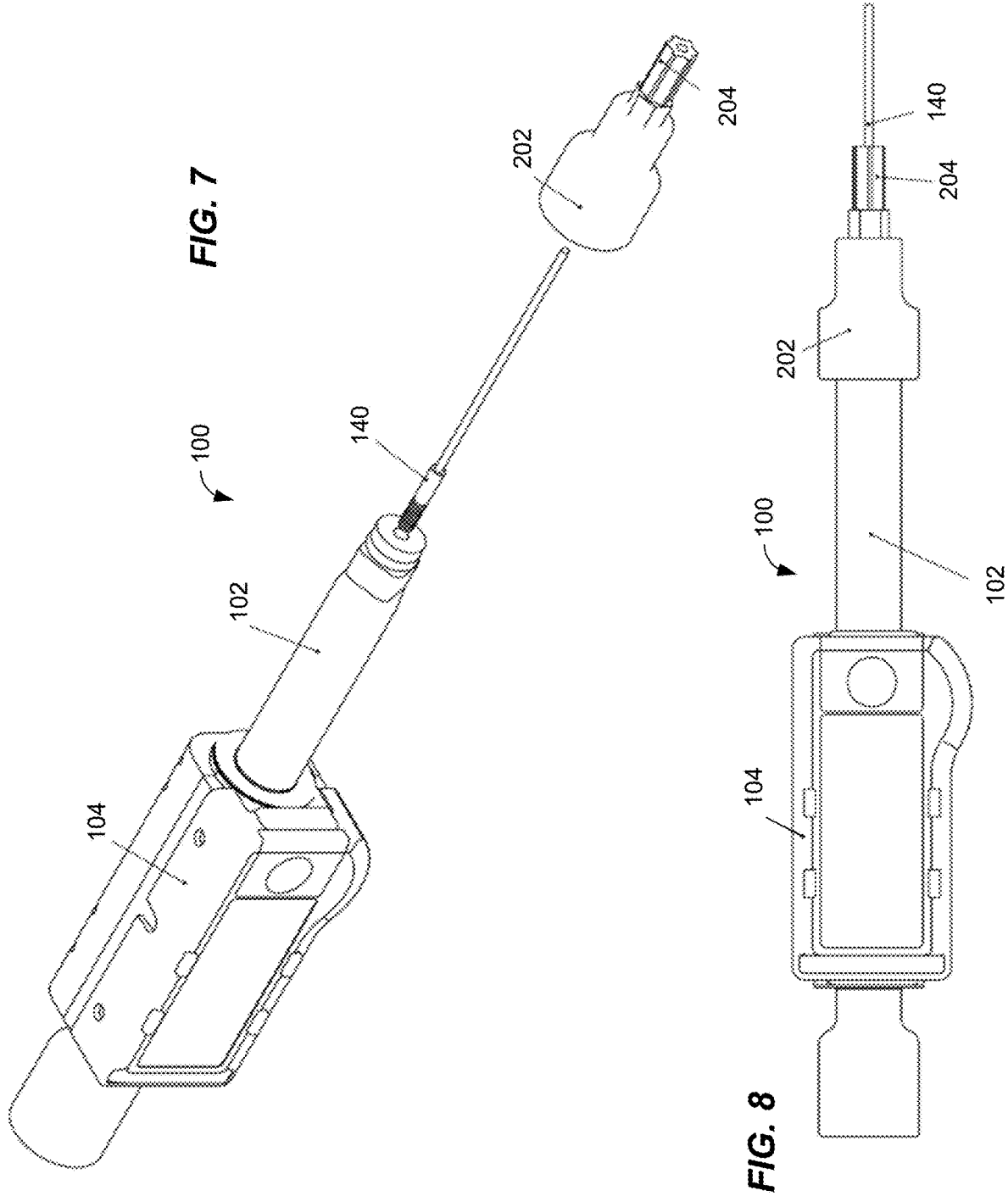

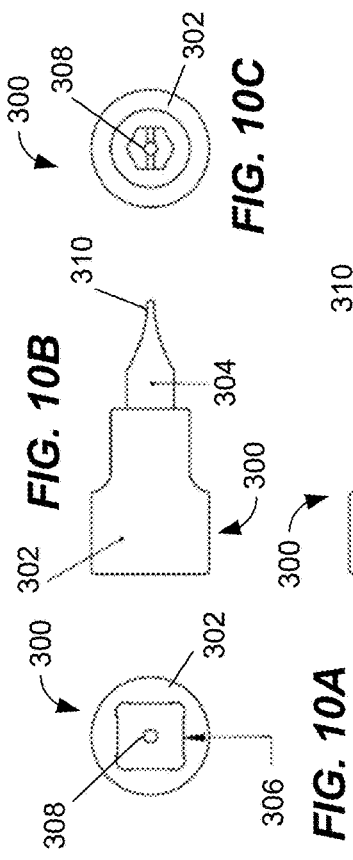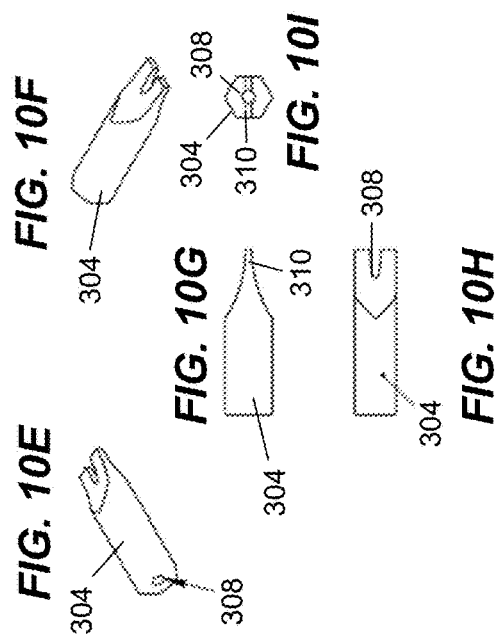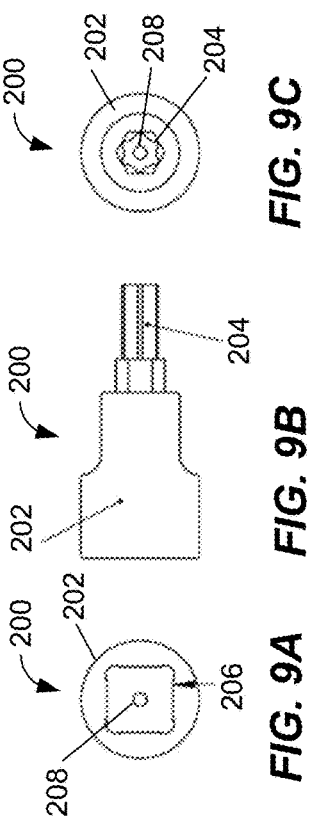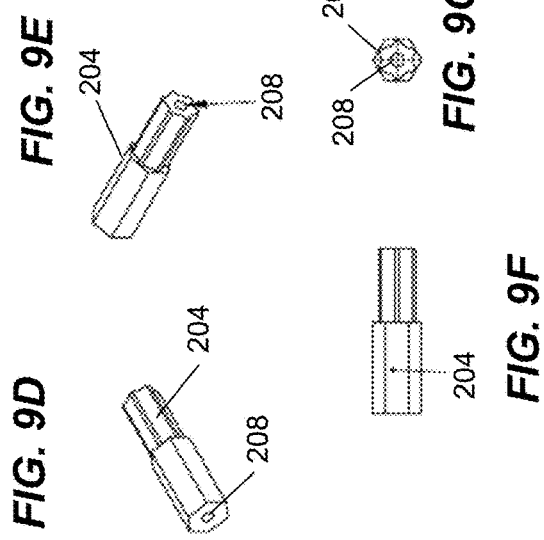

FIG. 12A
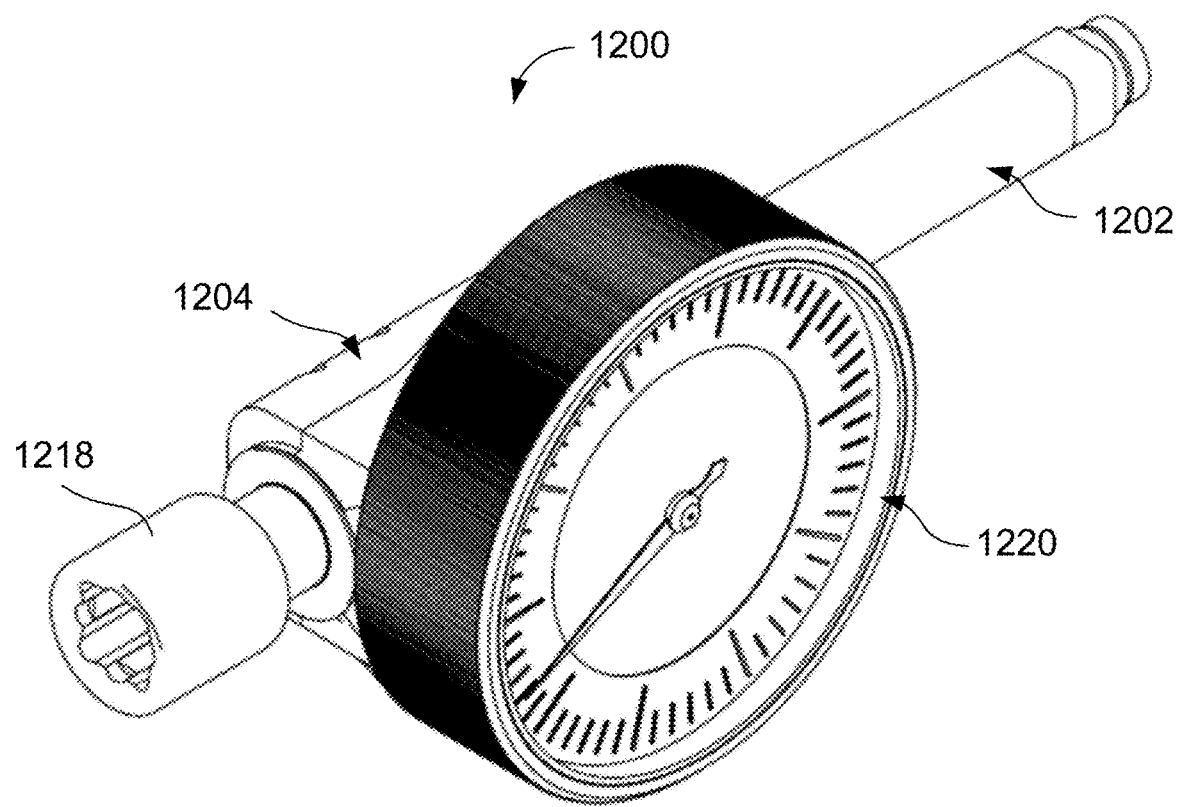
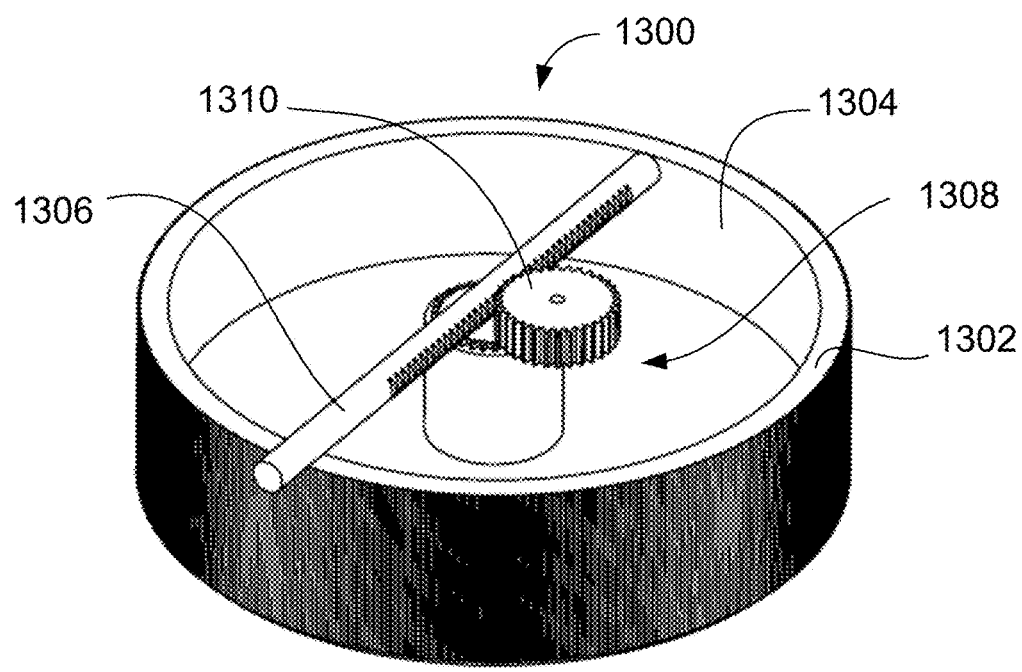
FIG. 13
(PRIOR ART)

COMBINATION TOOL FOR TENSIONED FASTENERS

PRIORITY CLAIM

The present application claims priority pursuant to 35 U.S.C. § 119(e) to U.S. Provisional Patent Application Ser. No. 62/798,749 filed Jan. 30, 2019, which application is incorporated herein in its entirety by reference.

FIELD

The present application relates to precision mechanical tools, and more particularly to a combination tool for tensioning a fastener, for example as done when truing and aligning a tension-spoked wheel.

BACKGROUND

Many precision assembly operations require measuring the amount of tensile strain applied to fasteners. For example, in the fabrication of engines and pressure vessels, stretch bolts need to be torqued while measuring the amount of bolt stretch to ensure tensile strain on the fastener is within specification. For threaded fasteners, precision fastening entails a cumbersome two-part process: first, the bolts are torqued to a certain specification and then, the tensile strain of the fastener is measured. This process is repeated until the manufacturing specs are achieved for each fastener.

Applications for tensioned fasteners include tensioned spoke wheels. Tensioned spoke wheels are useful for lightweight wheels such as used on bicycles, motorcycles, handcarts, and other conveyances. Fabrication, maintenance and repair of tensioned spoke wheels is labor-intensive using existing tools and methods. The torque placed on a spoke nipple does not necessarily indicate an amount of displacement, thus requiring frequent measurement of nut position on the spoke for accurate truing.

Typical spoke tools include small manual open-end wrenches with a square head that clamps on the sides of a nut or flats of a spoke nipple. These tools can torque the nut or nipple onto the spoke's thread with limited rotation depending on the clearance. Usually, when using these wrenches, the nut or nipple is turned about a ¼ turn or less each time. Using typical spoke tools and stopping the installation of a nut or nipple to make a measurement are tedious and slow the installation process. Truing a spoked wheel can be imprecise when done without precise measurement tools, resulting in wheels that are not perfectly round and/or are eccentric.

It would be desirable, therefore, to develop new methods and apparatus for tensioning precision fasteners, that overcomes these and other limitations of the prior art.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, an apparatus for tensioning a fastener while measuring displacement of the fastener relative to a tightening member may include a driver extension having an interior channel aligned along the driver extension's central cylindrical axis, open to a socket driver at an output end of the driver extension. The apparatus may further include a measurement probe in the interior channel, coupled to a measurement indicator on an exterior of the driver extension by a coupling that moves the measurement indicator in proportion to movement of the measurement probe. The apparatus may further include a measurement gauge coupled to an exterior of the driver extension that gauges displacement of the measurement indicator.

The apparatus may include other details, for example as described below. The apparatus may include a pair of bearings fitted to the shaft and holding the measurement gauge there between. The measurement indicator may be, or may include, a linear gauge. The measurement gauge may be, or may include, an electronic gauge unit configured to sense linear displacement of the measuring indicator.

In other aspects, the coupling may include a positioning bracket for holding the measurement indicator. The positioning bracket may be configured to be carried by a gauge positioning ring that slides along an exterior of the driver extension. The gauge positioning ring may coupled to the measurement probe via an opening in an exterior wall of the driver extension through which a connector (e.g., a set screw) can pass. The opening may be, or may include, a slot aligned parallel to the central cylindrical axis of the driver extension. The coupling may further include a spring positioned to urge the measurement probe out of the driver extension. The coupling may further include a positioning shaft interposed between the spring and the measurement probe and able to slide back-and-forth in the interior channel of the driver extension. The spring may be, or may include, a coil spring. The positioning shaft may be connected to the measurement probe by a removable connection and may be configured to guide sliding motion of the measurement probe inside the driver extension.

In other aspects, the driver extension may be, or may include, on an end opposite to the output end an input end with a polygonal socket for receiving a corresponding driver. The apparatus may further include a driver adaptor coupled to the output end of the driver extension. The driver adaptor may include a drive bit having a centrally-disposed through hole for accommodating the measurement probe.

In a related aspect, a method for tensioning a fastener may include driving a female threaded member along a threaded rod using a driver extension that includes an interior channel holding a measurement probe coupled to a measurement indicator on an exterior of the driver extension. The method may further include holding the measurement probe against an end of the threaded rod via an opening in the female threaded member. The method may further include reading the measurement gauge coupled to an exterior of the driver extension that gauges displacement of the measurement indicator without removing the driver extension from the female threaded member. The method may include tightening the female threaded member until the measurement gauge indicates a desired amount of displacement or loosening the female threaded member if the measurement gauge indicates more than a desired amount of displacement. Reading the measurement gauge viewing an electronic display on the gauge unit. The method may include transmitting measurement data from the measurement gauge to an independent electronic device using a wireless connection.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 7 is an upper isometric, partially exploded view of the tool shown in FIG. 1, with a measurement probe component and socket driver.

FIG. 8 is a side view of the tool as shown in FIG. 7.

FIGS. 9A-9G show various views of a hexagonal socket driver for use with the tool shown in FIGS. 1-8.

FIGS. 10A-10I show various views of a slot-headed screwdriver for use with the tool shown in FIGS. 1-8.

FIGS. 12A-12D are various view of an embodiment of the tool with a dial indicator instead of a digital display.

FIG. 13 is a view of a prior art mechanism for a dial indicator, that may be adapted for use with the tool shown in FIGS. 12A-D.

DETAILED DESCRIPTION

Figure 1:
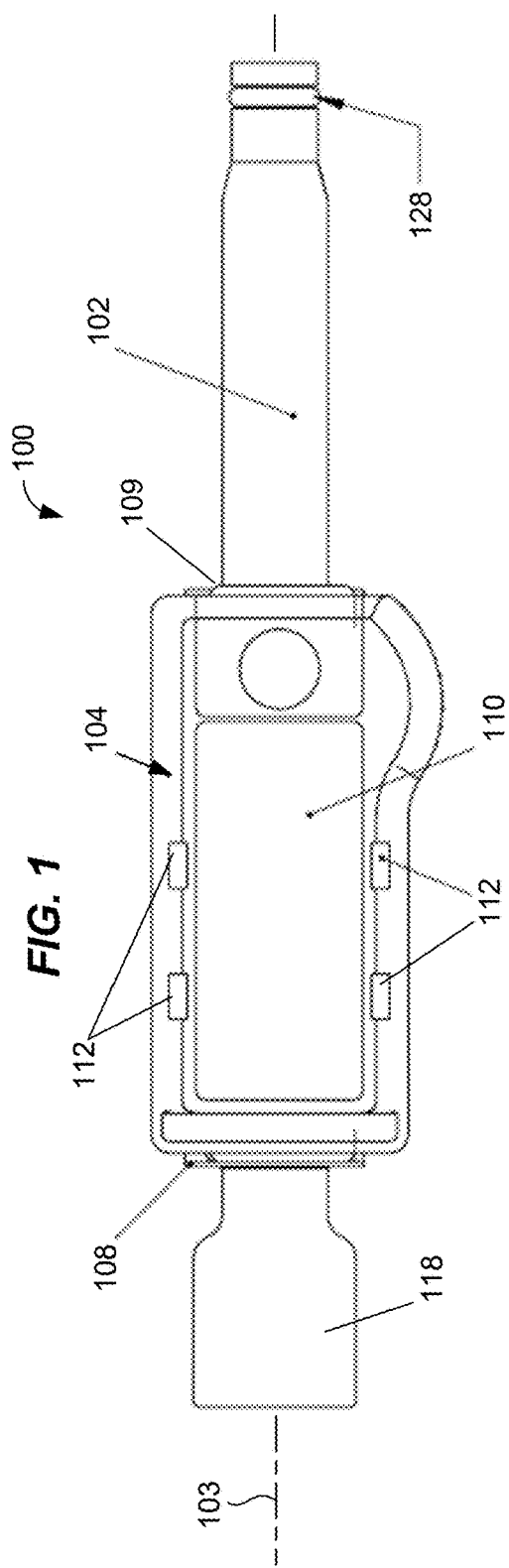
FIG. 1 is a top view illustrating a tool for installing a tensioned fastener while measuring tensile strain thereof.
Figure 2:
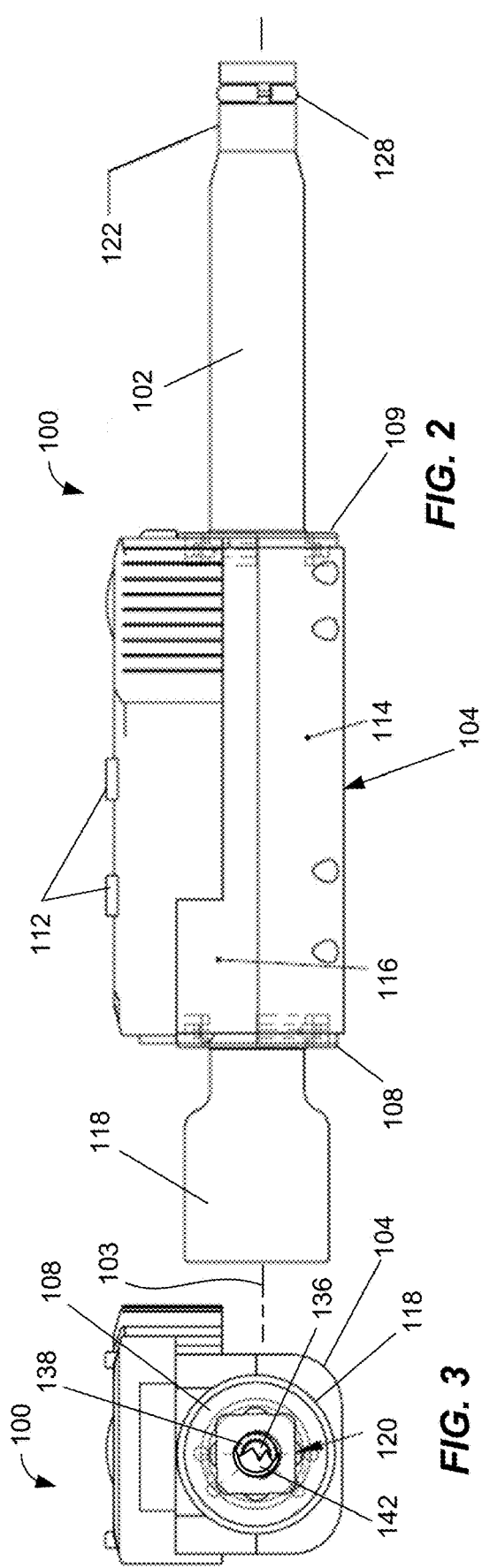
FIG. 2 is a side view of the tool shown in FIG. 1.
Figure 3:
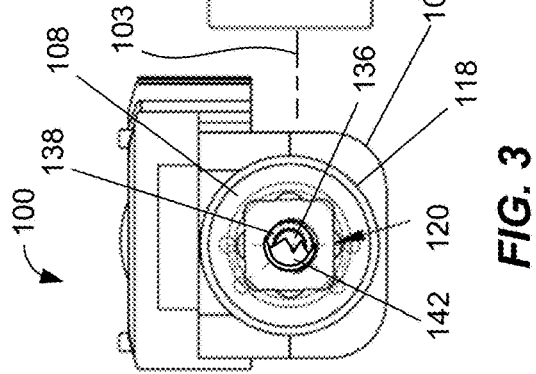
FIG. 3 is an end view of the tool shown in FIG. 1.
Figure 4:
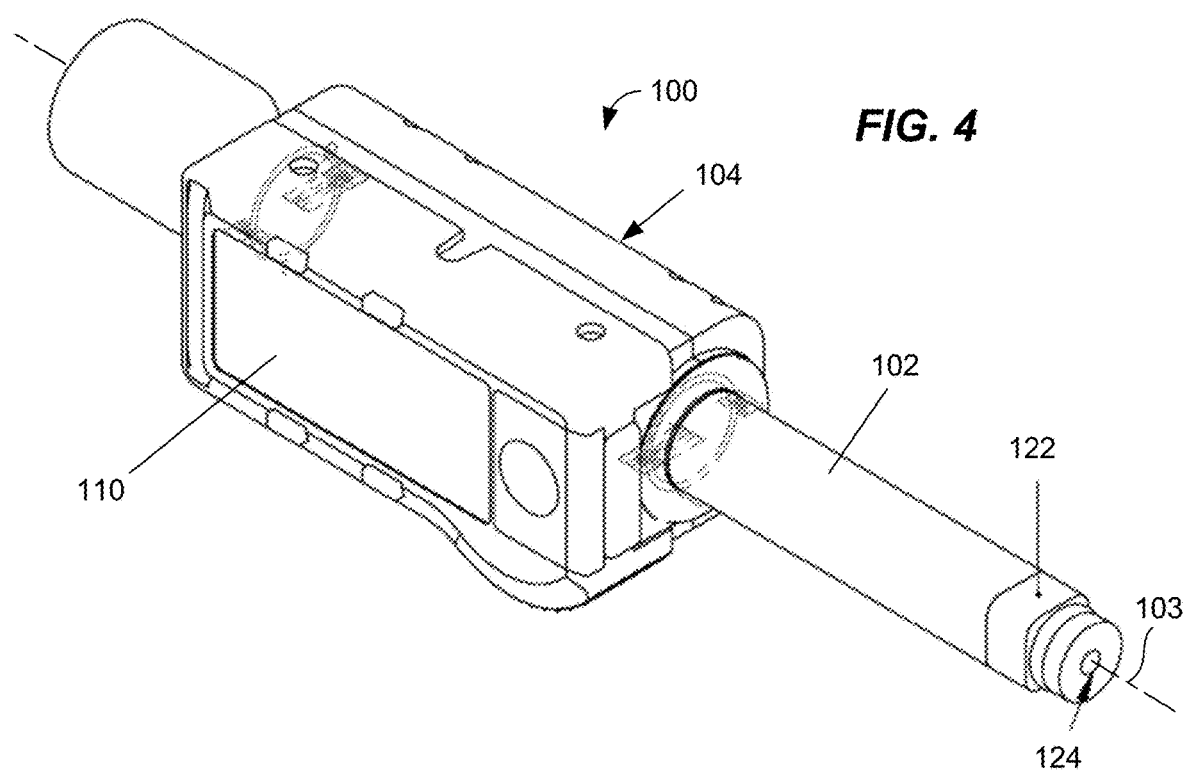
FIG. 4 is an upper isometric view of the tool shown in FIG. 1.
Figure 5:
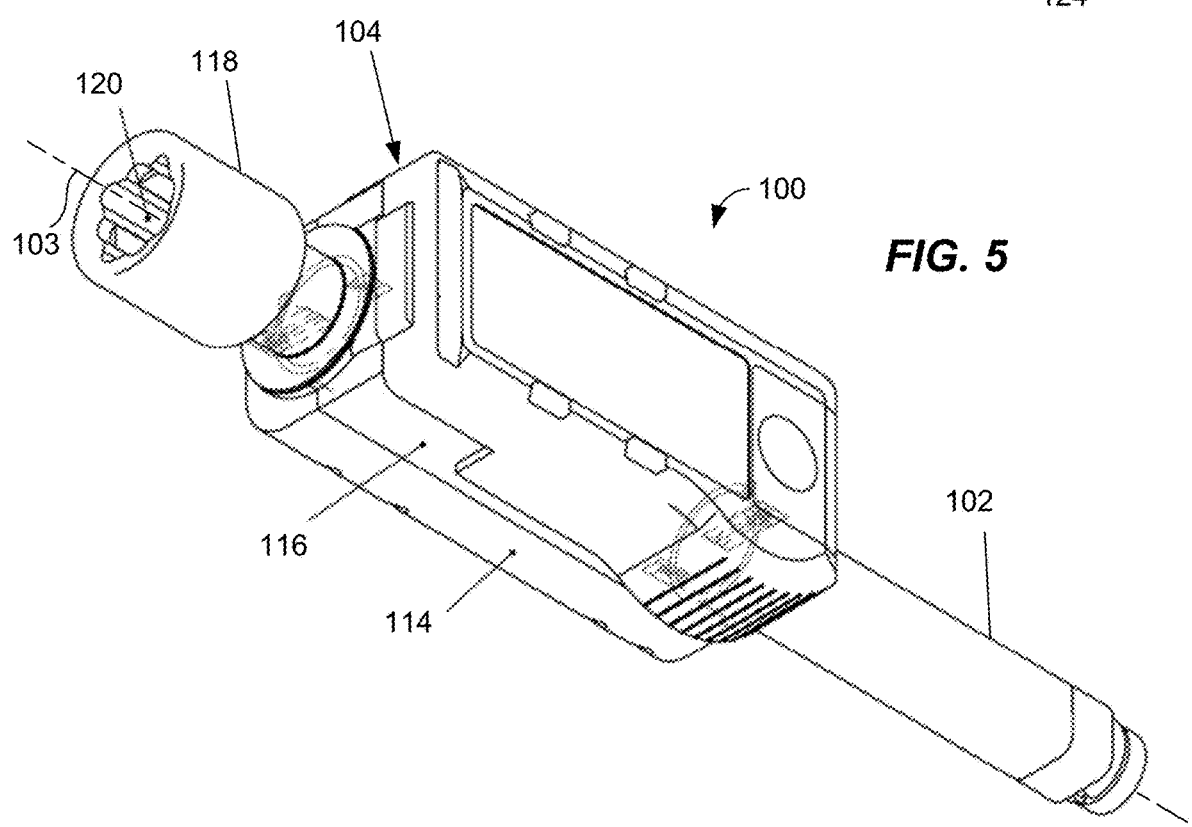
FIG. 5 is a lower isometric view of the tool shown in FIG. 1.

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

A tensioning and measuring tool as described herein combines functions of a socket or bit driver with a depth gauge, in a single tool. Unlike a conventional depth gauge that has one functionality of measuring depth or a drive extension that has one functionality of torqueing a nut or other female threaded member, the tool can make a precise measurement of distance while torqueing a nut or the like at the same time. In an aspect, the tool may collect and record measured displacement to a controller or data server via a wired or wireless connection.

Applications for the precision tool may include truing and aligning any spoke wheel such as bicycles, motorcycles or dirt bikes. The illustrated design is made for measuring the amount of distance (i.e., linear displacement) of a nut or the like is threaded along a spoke of a wheel. The tool determines distance by measuring the distance between the edge of the spoke and the face of the threaded member. The illustrated tool may be used with any existing ⅜-inch ratchet driver such as an impact wrench and torque wrench but is not limited to the illustrated size. Because the tool is designed to work with standard tools that people already have, a user may replace the fastener tip with any driver tip such as a Torx bit, screw driver bits and even open standard sockets that is modified with a through hole for the tool's measurement probe. In addition, the tool may be used with multiple sizes, configurations and lengths of measurement probes for different applications. Driver bits for the tool are modified compared to standard bits, depending on the application. For tightening spokes, a standard driver bit may be provided with through hole for the measurement probe to pass through. The driver bits can be of any size, shape and length with a proportional through hole.

In an aspect, the tool can help a user to true and align a spoke wheel by making sure the distance between the center of the wheel, hub section, is the same throughout with respect to rim section in all three-dimensional planes. The tool measures linear displacement of the spoke relative to the nut or spoke nipple, enabling the user to quickly and conveniently set the length of every spoke to be the same. Setting to equal length ensures that the rim is round and aligned with the hub without eccentricity. The length of each spoke is determined by subtracting the distance a nut or spoke nipple is threaded on the spoke from full length of the spoke. An amount of threaded engagement is determined by measuring the distance between the end of the spoke and the face of the threaded nut or spoke nipple.

In another aspect, a user can drive the tool with a torque wrench, enabling contemporaneous measurement of both torque on the female threaded member and stretch of a bolt, spoke, or threaded rod during installation of the female threaded member.

Referring to FIGS. 1-8, a tensioning and measurement tool 100 enables a craftsperson to apply torque to a threaded fastener while measuring tensile strain in the same fastener. The tool 100 includes a driver extension piece 102 coupled to an electronic measurement gauge 104 via a pair of precision ball bearings 108, 109. The outer races of the bearings 108, 109 are fixed to housings 114, 116 of the electronic measurement gauge 104, while the inner races are fixed to the driver extension piece 102. The driver extension 102 may include a generally cylindrical shaft interposed between an input end 118 for receiving torque and an output end 122 for transmitting torque to a driver.

The driver extension 102 may be formed of any suitable structural material, for example steel, titanium, glass or carbon fiber composite material. The diameter and length of the extension 102 may be of any suitable dimension for the application at hand, depending on the intended geometry and torque range. The driver extension 102 may be circular in cross section along most of its length between its two ends or may have a non-circular (e.g., polygonal) cross section. A torque input end 118 of the extension may include a polygonal (e.g., square, hexagonal, etc.) socket for applying torque, which may be conventional in design. In some embodiments, the through hole 124, also called a channel, may extend into the socket 120 in end 118. In other embodiments, the channel terminates before reaching into the socket 120.

The driver extension 102 differs from prior art extensions by including the interior channel 124 along a central cylindrical axis 103. The channel 124 may pass through an entire length of the extension 102, and may accommodate a positioning shaft 136, coil spring 138 and a measurement probe 140 coupled to the positioning shaft 136 via a threaded connection (FIGS. 6A-8). The coil spring may be captured between the positioning shaft and a threaded plug or set screw 142 in the end 118. The positioning shaft 136 is formed for a sliding fit inside a cylindrical interior channel of the driver extension 102 to govern sliding back-and-forth motion and transfer to the measurement indicator via a coupling 150. The threaded coupling between the probe 140 and the shaft 136 enables convenient replacement of the probe to accommodate different lengths or diameters, or to replace damaged probes.

The distal, free end of the measurement probe 140 passes through the hole 124 and through a corresponding hole 208, 308 in a driver 200, 300 (FIGS. 7-11E) and is urged by the spring 138 against the head of the fastener (e.g., spoke, not shown) being torqued. As the nut or the like turns, the end of the fastener passes through the nut and pushes the measurement probe 140 into the interior of the driver extension 102. Relative sliding motion between the measurement probe and the driver extension 102 is registered by the gauge unit 104 via the positioning bracket 132 and its attached linear gauge 134. As used herein, a linear gauge includes a fixed pattern of optical, electrical, magnetic, or other indicating marks that is readable by a human or machine. In the illustrated embodiment, an electronic sensor (not shown) in the electronic measurement gauge unit 104 reads a change in inductance proportional to linear movement of the linear gauge 134. Any suitable method of reading a linear gauge may be used.

The driver extension 102 may further include a groove for a retaining ring 128 and an O-ring 126 to grip a socket driver adapter 202, 302 and retain it on the extension 102 during handling. The driver extension 102 may further include a coupling mechanism 150 (hereinafter referred to as a "coupling"), including a slot 156 for a set screw 152 coupling the positioning shaft 102 to the gauge positioning ring 130 while enabling linear movement of the ring 130 relative to the driver extension 102. As the measurement probe 140 is pushed in and out of the driver extension 102 by the end of the fastener (e.g., spoke, bolt or threaded rod) being tensioned, the probe 140 drives the positioning shaft 136, the gauge positioning ring 130 and the positioning bracket 132 with the linear gauge 134, creating linear displacement relative to the driver extension 102.

The length of the fastener under tension is related to the displacement sensed by the gauge unit 104. For example, the length for a threaded rod (e.g., a bolt shaft) tightened by a nut may be computed by L-δ-t+ε, wherein 'L' is the total length prior to installation of the nut, 'δ' is the measured displacement, 't' is the thickness of the nut, and 'ε' is the linear strain of the fastener. In many applications, and 'L' and 't' are identical for every spoke, and 'ε' may be assumed identical for every spoke. Thus, in many applications the mechanic can adjust for equal 'δ' without needing to consider other factors, knowing that for the given geometry, a given 'δ' will result in a corresponding known value of 'ε'.

The gauge unit 104 may be any suitable digital gauge that measures distance. For example, the gauge unit 104 may be a mechanical dial or a digital device with a circuit board, control buttons 112 and a display screen 110, as used for digital strain gauges, depth gauges or calipers. The gauge unit 104 may include a mounting housing 116 and a cover 114 attached to the driver extension 102 by the bearings 108, 109. The mounting housing 116 may be attached to the gauge unit 104 and mounted on the two precision bearings 108, 109, and may house the positioning bracket 132 and the linear gauge 134. The cover 114 may be attached to the mounting housing 116, and cover all the inner positioning components 132, 134 used to measure tensile strain.

The two precision bearings 108, 109 may be press fit on the driver extension 102 and coupled to the gauge unit 104 mounting housing 116 and the cover 114. The two bearings 108, 109 permit rotation of the driver extension 102 relative to the gauge unit 104.

Figure 6A:
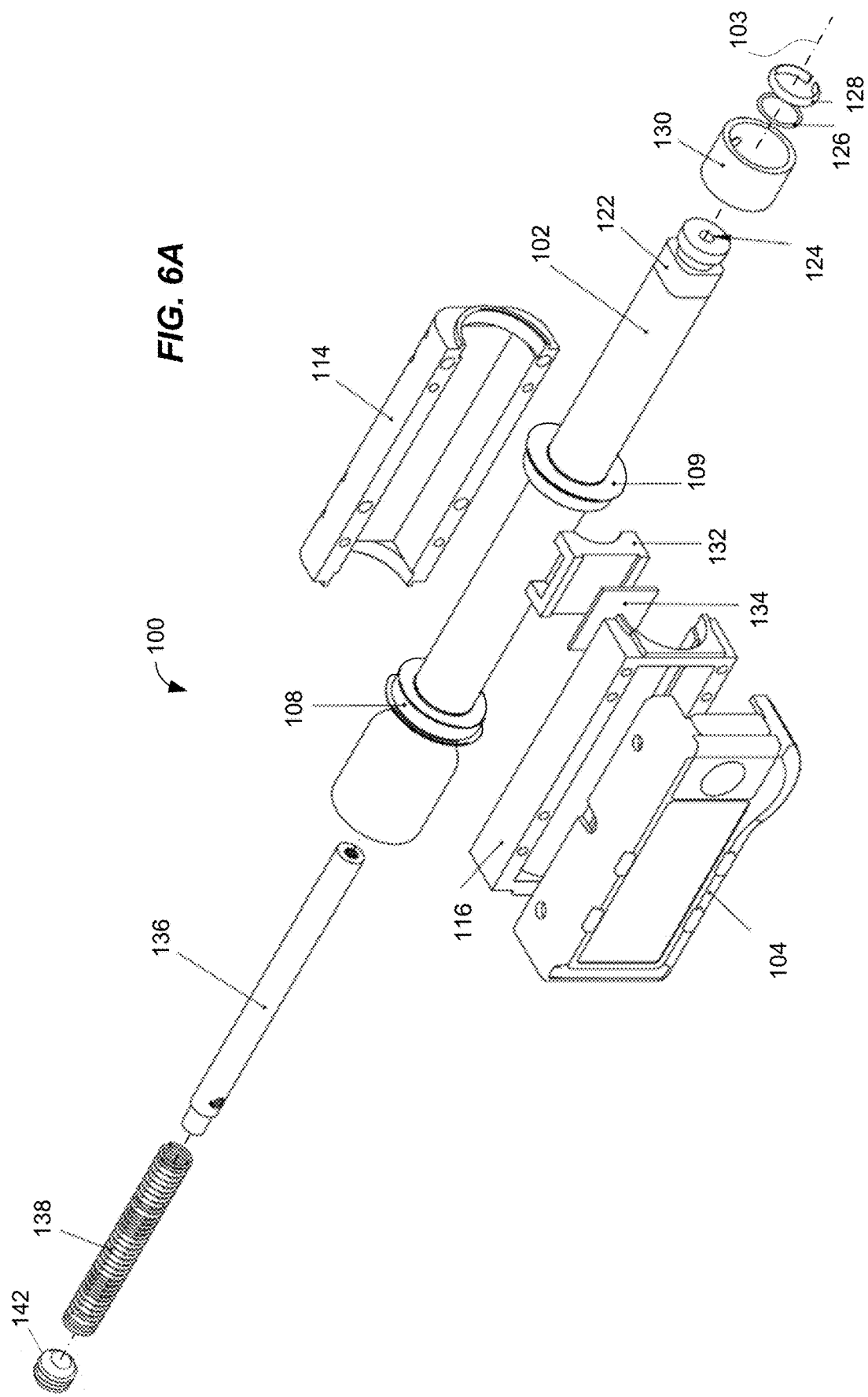
FIG. 6A is an exploded view of the tool shown in FIG. 1.

A resilient retaining ring 128 may be mounted around the O-ring 126 that seats on the extension driver 102, to engage a corresponding socket driver adapter 202, 302 and retain it on the extension 102. The retaining O-ring 126 resiliently supports the retaining ring 128, permitting the retaining ring to compress when a socket driver adapter 202, 302 is assembled to or removed from the socket driver 122. Once the driver adaptor 202, 302 is in place, resiliency of the retaining ring 128 causes it to expand against an interior of the adaptor 202, 302, which may include a groove around its interior surface to receive the ring 128 and prevent the driver adaptor 202, 302 from slipping off during use. The resilient retaining ring 128 may be made of spring steel or similarly stiff resilient material and may be divided by a cut as shown in FIG. 6A enabling contraction and expansion.

Figure 6B:
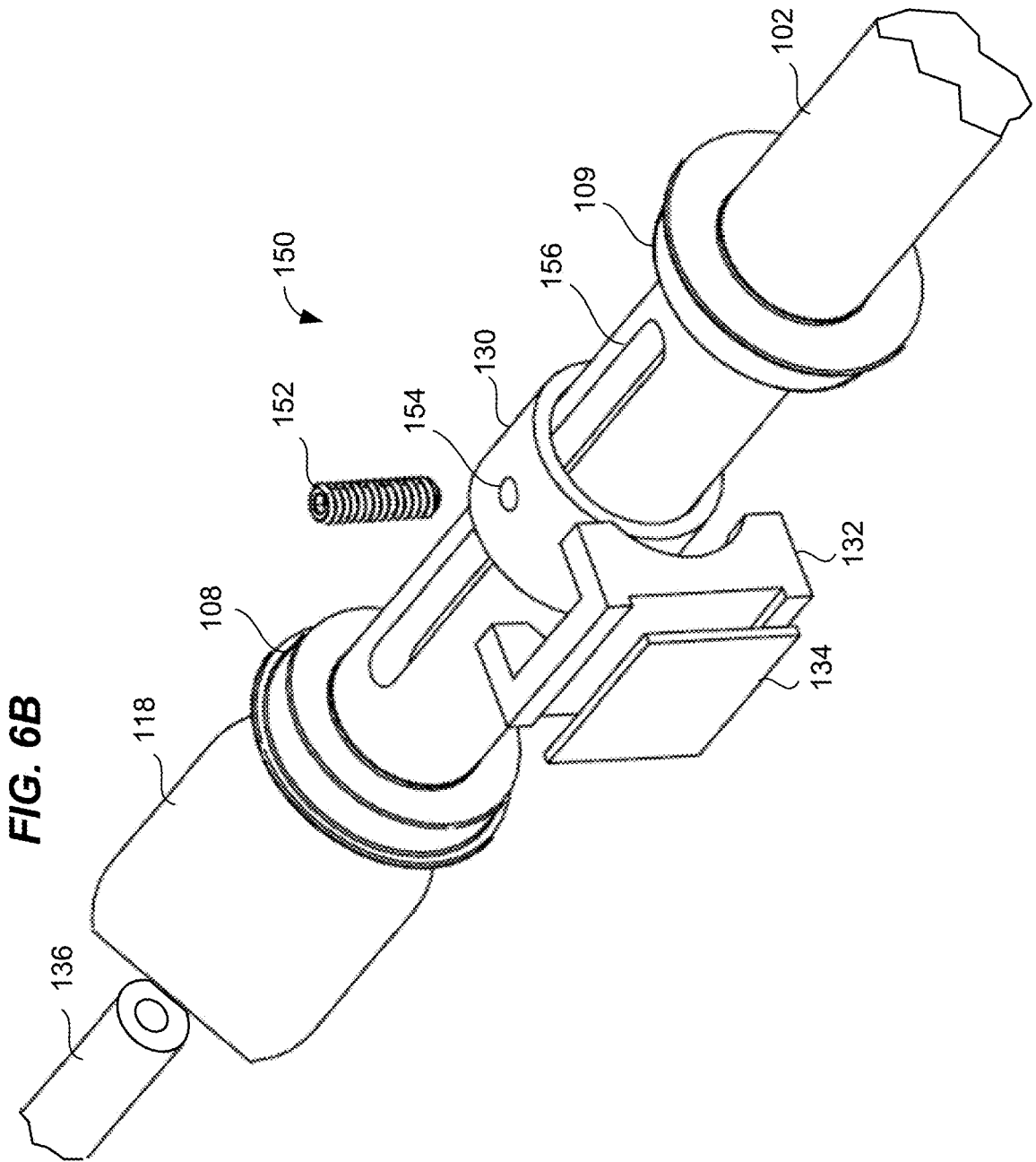
FIG. 6B is a detail view showing a mechanism for coupling an interior measurement probe to an exterior measurement indicator of the tool shown in FIG. 1.

The gauge positioning ring 130 is sized for a sliding fit along the cylindrical shaft of the driver extension 102 between the two bearings 108, 109. The positioning ring 130 is free to slide back and forth along the driver extension 102 and may be attached with a set screw or other fastener passing through a hole 154 (e.g., a threaded hole) 152 to the positioning shaft 136. The fastener 152 may pass from an exterior of the extension driver 102 to the positioning shaft 136 in the channel 124 via a linear slot 156 in the extension driver 102 (FIG. 6B). The slot is concealed under the gauge housing 114, 116, is parallel to the cylindrical axis of the driver extension 102 and should be slightly longer than the designed range of measurement. For example, if the range of measurement is 1 cm the slot may be 1 cm or greater in length (e.g., 1.1 or 1.2 cm). The positioning ring 130 drives the positioning bracket 132 back-and-forth as the measurement probe 140 moves in and out of the driver extension 102. The measurement probe is coupled to the positioning shaft 136, for example by a threaded end.

The positioning bracket 132 is shaped to move linearly along the driver extension 102 while permitting the extension to rotate, for example by including one or more semicircular sliding surfaces that engage the outer cylindrical surface of the gauge positioning ring 130 (FIG. 6B). The positioning bracket holds the linear gauge 134, which is an example of a measurement indicator. The linear gauge 134 may be registered by the gauge unit 104 as known in the art for measuring linear displacement, using an electrical, mechanical, optical, or other method for registering linear displacement. The positioning bracket 132 rides with the gauge positioning ring while enabling rotation of the driver extension 102 relative to the gauge unit 104. Thus, a user may drive a fastener with the driver extension 102 while holding the gauge unit stationary to view a continuous readout of linear movement. The positioning bracket 132 is driven by the positioning shaft 136, which slides back and forth as the measurement probe 140 is displaced by tensile strain of the fastener being installed, via the coupling 150.

In some embodiments, the linear gauge 134 may include a sinusoid pattern of electrical traces or other movement indicator (e.g., optical or magnetic structure) for determining linear displacement and is read by the gauge unit 104 circuit board. The linear gauge 134 may be mounted to the bearings 108, 109 that hold it in a fixed linear position relative to the driver extension 102 while allowing it to rotate around the central cylindrical axis of the extension 102. The gauge unit 104 thus reads out linear displacement based on movement of the positioning bracket 132 along the cylindrical axis of the driver extension 102.

The positioning shaft 136 may be connected to the measurement probe 140 by any suitable coupling, for example, the coupling 150 shown in FIG. 6B. The shaft 136 and probe 140 slide together inside the driver extension 102. The shaft 136 is coupled to the sliding ring 130 that carries the positioning bracket 132. The shaft 136 and probe 140 are urged out of the driver extension 102 and against the end of a threaded rod by the coil spring 138. Meanwhile, the driver bit is held firmly by the user against a onto a female threaded member (e.g., a nut or spoke nipple) is being threaded to enable application of torque. As the female threaded member is driven along the thread of its mating male member, the end of the male member pushes the measurement probe further inside the extension shaft 102, causing linear displacement of the bracket 132 and linear gauge 134 via the coupling 150 already described. When not in use, the coil spring may urge the measurement probe a short distance (e.g., 1-30 mm) out of the output end to a rest position defined by a stop formed in an interior of the driver extension 102.

The measurement probe 140 may be made from any suitable material, and configured in any suitable length, diameter or cross-sectional shape. Its function is to be pushed in and out of the driver extension by a reference surface point of a threaded male member onto which a female threaded member is being driven for fastening purposes. The illustrated tool is configured for tightening a female threaded member (e.g., a nut, spoke nipple, or similar article with internal threads around a cylindrical channel open to the driven face of the member) on a threaded rod, e.g., a spoke for a wheel.

FIGS. 9A-11E show examples of socket driver adapters 200, 300 with different driver tips 202, 302. The driver tips 204, 304 each include a through hole 208, 308 to accommodate passage of the measurement probe 140. The driver tips 204, 304 can be made from any material, size, diameter, length and shape needed to drive the desired fastener. The socket driver adapters 200, 300 may further include standard bit drivers 202, 302, with respective drive sockets 206, 306. The driver adaptor 200 includes a hexagonal bit driver 204, while the adaptor 300 includes a blade 310 for driving a slot-headed screw head, for example, as found on many spoke nipples. Many other configurations of bit drivers may also be suitable.

The illustrated tool 100 enables users to true and align spoke wheels in a more accurate and efficient way. The tool enables a repeatable process that yields the same results every time, while being more time-efficient. Thus, the tool can reduce downtime and save money while simplifying truing and alignment of wheels.

The tool can be scaled to work on other applications that use threaded rods or bolts. Bolts typically include a head and an opposing threaded end. The present tool is designed for application to the installation of a female threaded member (e.g., nut or spoke nipple) on a threaded end of a cylindrical male portion of a fastener. For example, in assembly of internal combustion engines, stretch bolts need to be torqued while measuring the stretch to the engine's specifications. The conventional process today is done in a repetitive two-part process: first, the bolts are torqued to a certain spec and then, the stretch of the bolt is measured. This process is repeated until the manufacturing specs are archived for each necessary bolt. The present tool enables measurement of stretch while torqueing a bolt's nuts.

Hence, a tool is provided with a continuous measurement indicator to measure the distance or height between two surfaces, capable of showing the instantaneous distance measurement. In application of wheel spokes, the tool measures the distance between the threaded end of the spoke and the face of the threaded nut. Unlike a depth gauge, the tool provides the distance or depth measurement while it is torqued and can be driven by any suitable socket driver. The driver end tip can be attached like any socket and can have any shape for any screw or bolt heads. Advantageously, the tool provides a capability to be used with a torque wrench at the same time, enabling measurement of torque at the same time with measurement of advancement of the threaded end of the bolt, spoke, or threaded rod past the nut.

In an aspect, the tool can be torqued/rotated to either direction (clockwise or counterclockwise) while a measurement probe moves linearly, in and out, changing the display reading on the digital gauge via a coupling to a measurement indicator exterior to the tool. Thus, the tool provides an instantaneous distance measurement display which speeds up the process. Unlike the standard tools, the instant tool can tighten or loosen a nut in a faster way and more convenient way, while providing the user with precise displacement information.

Despite being a precise measurement tool, the tool 100 is easy to use by do-it-yourself users or professionals. Trueing and aligning spoke wheels using the instant tool provides a controlled, more precise result. The tool reduces process downtime drastically and increases accuracy. The result is a safer wheel with more uniform roundness, less eccentricity and increased tire longevity.

Figure 11:
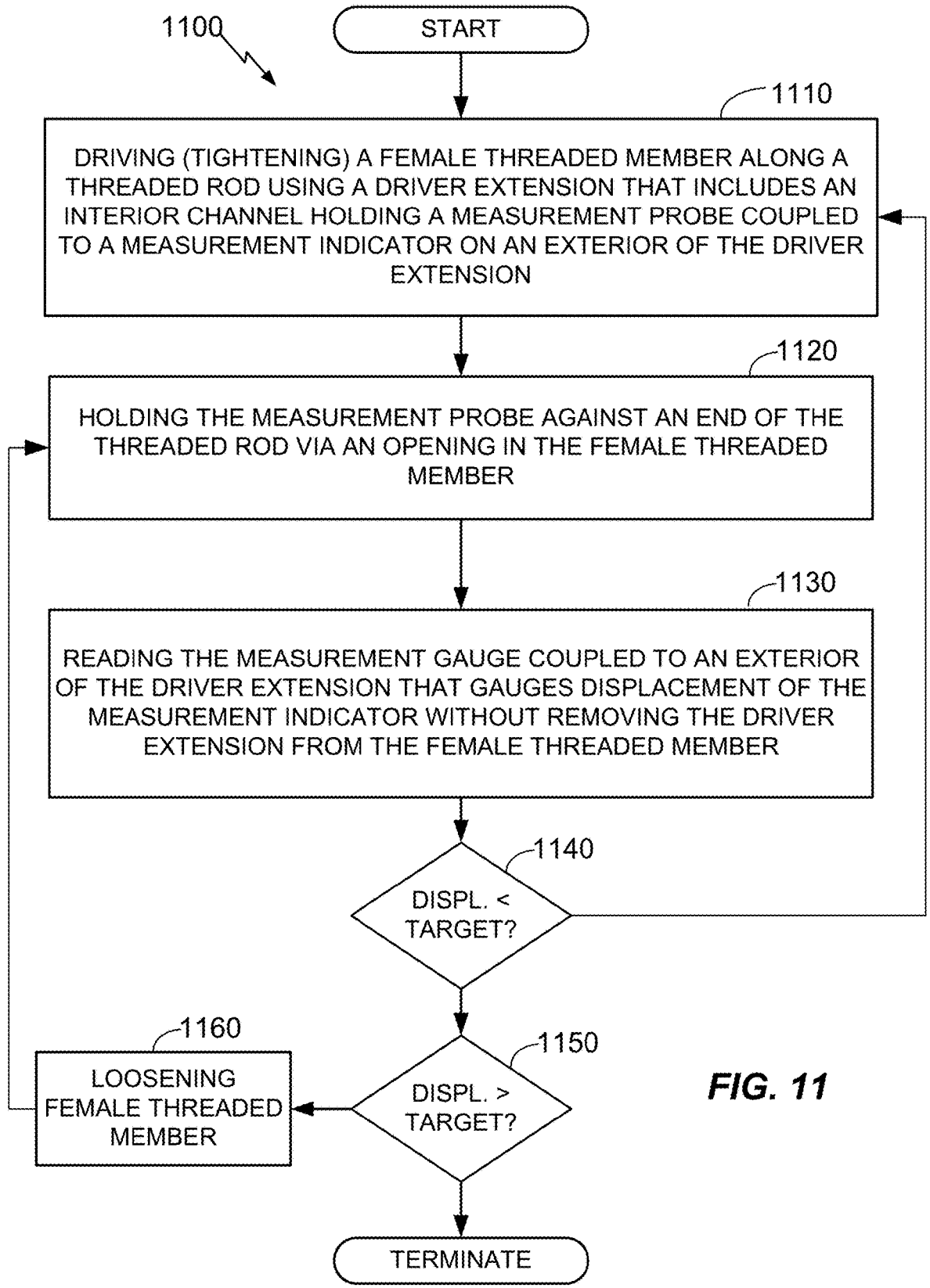
FIG. 11 shows operations of a method for tensioning a fastener using a tool as shown and described herein.
Figure 12B:
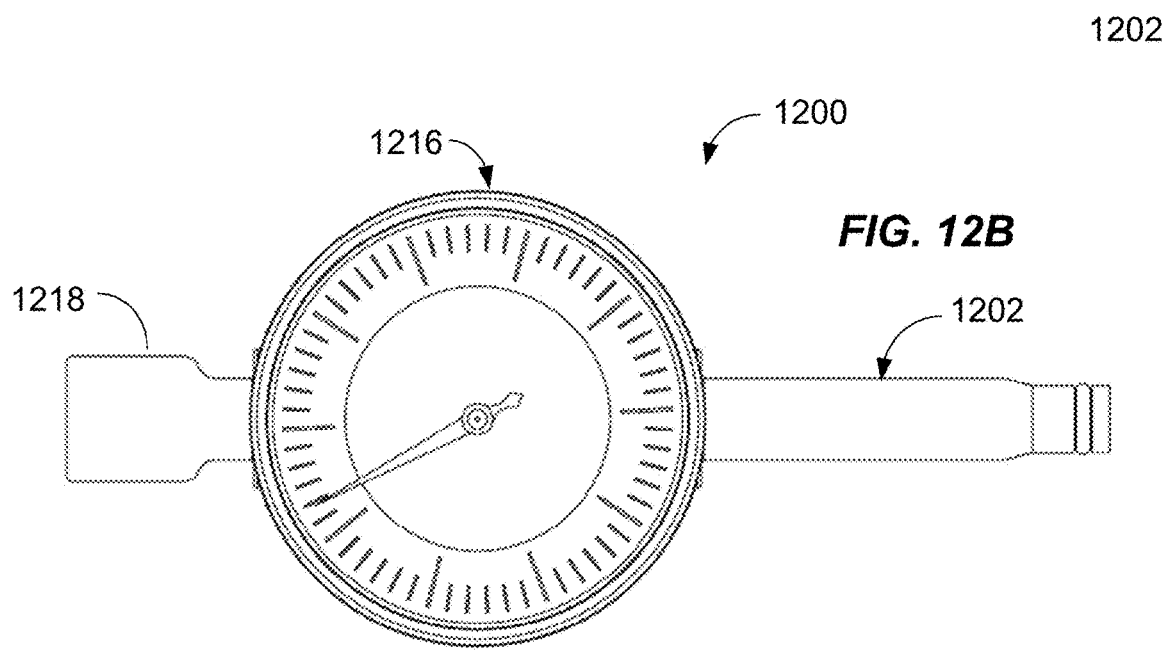
Figure 12C:
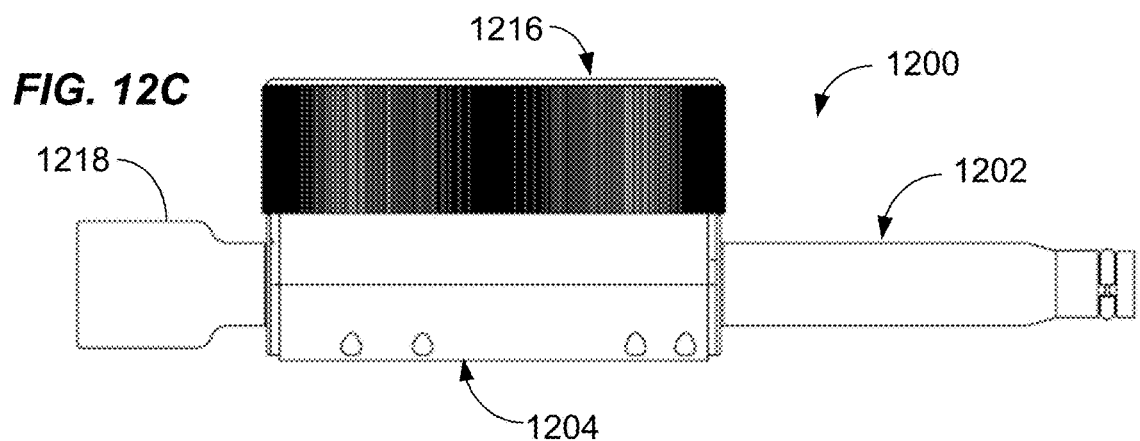
Figure 12D:
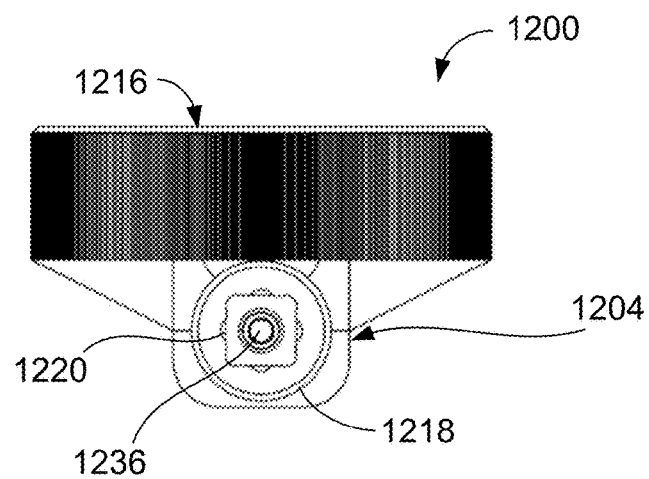

In summary of the foregoing, FIG. 11 illustrates operations of a method 1100 for tensioning a fastener using a tool as shown and described herein. The method may include, at 1110, driving (e.g., tightening) a female threaded member along a threaded rod using a driver extension that includes an interior channel holding a measurement probe coupled to a measurement indicator on an exterior of the driver extension. The threaded rod may be part of a bolt, screw, wheel spoke, tension bar, or similar fasteners, and is generally cylindrical in shape. It need not be threaded along its entire length, and in most applications is threaded only over a portion of its length at the end of the rod. The female threaded member may be, for example, a nut or a spoke nipple, characterized by an internal thread around an internal channel that is open to the driven face of the member. The method may further include, at 1120, holding the measurement probe against an end of the threaded rod, while driving the female threaded member (e.g., nut or spoke nipple). The method may further include, at 1130, reading the measurement gauge coupled to an exterior of the driver extension that gauges displacement of the measurement indicator without removing the driver extension from the female threaded member, and even while driving it. As indicated at 1140, the method 1100 may include tightening the female threaded member until the measurement gauge indicates a desired amount of displacement. Conversely, as indicated at 1150 the method 1100 may include loosening the female threaded member 1160 if the measurement gauge indicates more than a desired amount of displacement while holding the measurement probe against the end of the bolt, screw, wheel spoke, or threaded rod.

Further aspects of the method 1100 may include, for example, reading the measurement gauge by viewing an electronic display on the gauge unit, or transmitting measurement data from the measurement gauge to an independent electronic device using a wireless connection, for control, archiving, or other use. Feedback from the measurement gauge may be used for automatic control of tightening and loosening.

Referring to FIGS. 12A-D, in some embodiments a tool 1200 like the digital tool 100 may use a mechanical or electronic dial indicator 1220 on an interface housing 1202 or other coupling to indicate linear displacement, instead of an electronic gauge unit. Components of the dial indicator tool 1200 may include, for example, a driver extension 1202 coupled to a drive socket 1220 at an input end 1218. The driver extension 1202 may be configured with interior components like the digital tool 100, for example, a positioning shaft 1236 (FIG. 12D) slideably retained in an interior channel of the driver extension 1202 and coupled to an indicating mechanism as previously described. The dial indicator 1220 if electronic may use a contactless electronic sensor that reads a gauge plate as previously described.

The dial indicator if mechanical may be coupled via a mechanical link (e.g., one or more gears) to the dial readout, actuated by a sliding interior component (e.g., positioning shaft) inside the driver extension 1202. FIG. 13 shows a mechanism 1300 of a prior art dial indicator, which includes a circular frame 1302 with a through sleeve 1304 holding a worm gear 1306 coupled to a gear assembly 1308 for moving a pointer of the dial indicator. The mechanism 1300 may be adapted for use with a positioning mechanism, for example by configuring the positioning shaft with a gear rack (not shown) that drives a pinion gear (not shown, but can be similar to gear 1310) and coupling the rotational output of the pinion gear to the pointer of the dial indicator by any suitable gear assembly.

The previous description of the disclosed aspects is provided to enable any person skilled in the art to make or use the present disclosure. Various modifications to these aspects will be clear to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An apparatus for tensioning a fastener while measuring displacement of the fastener relative to a female threaded member, the apparatus comprising:
   a socket driver extension comprising an input end configured for applying torque coupled by a shaft to a socket driver at an output end of the socket driver extension, and an interior channel aligned along the socket driver extension's central cylindrical axis passing through the shaft and the socket driver;
   a measurement probe in the interior channel, coupled to a measurement indicator on an exterior of the driver extension by a coupling that moves the measurement indicator in proportion to movement of the measurement probe, wherein the coupling comprises a fastener attached to the measurement probe and passing through an opening in the socket driver extension, the fastener coupled to a positioning bracket holding the measurement indicator and configured to slide along an exterior of the socket driver extension; and
   a measurement gauge coupled to an exterior of the driver extension that gauges displacement of the measurement indicator.

2. The apparatus of claim 1, further comprising a pair of cylindrical bearings fitted to the shaft and holding the measurement gauge there between.

3. The apparatus of claim 1, wherein the measurement indicator comprises one of a linear gauge or a dial indicator.

4. The apparatus of claim 1, wherein the coupling further comprises a gauge positioning ring interposed between the positioning bracket and the fastener and configured to slide along an exterior of the socket driver extension.

5. The apparatus of claim 4, wherein the gauge positioning ring is coupled to the measurement probe via the fastener passing through the opening in an exterior wall of the socket driver extension.

6. The apparatus of claim 4, wherein the opening comprises a slot aligned parallel to the central cylindrical axis.

7. The apparatus of claim 1, wherein the coupling further comprises a spring positioned to urge the measurement probe out of the socket driver extension.

8. The apparatus of claim 7, wherein the coupling further comprises a positioning shaft interposed between the spring and the measurement probe.

9. The apparatus of claim 8, wherein the spring comprises a coil spring.

10. The apparatus of claim 8, wherein the positioning shaft is connected to the measurement probe and is configured to guide sliding motion of the measurement probe inside the socket driver extension.

11. The apparatus of claim 1, wherein the input end configured for applying torque comprises a polygonal socket for receiving a corresponding driver.

12. The apparatus of claim 1, further comprising a driver adaptor coupled to socket driver at the output end of the socket driver extension.

13. The apparatus of claim 11, wherein the driver adaptor comprises a drive bit having a centrally-disposed through hole for accommodating the measurement probe.

14. The apparatus of claim 1, wherein the measurement gauge comprises an electronic gauge unit configured to sense linear displacement of the measuring indicator.

15. A method for tensioning a fastener, comprising:
   driving a female threaded member along a threaded rod using a socket driver extension comprising an input end configured for applying torque coupled by a shaft to a socket driver at an output end of the socket driver extension, and an interior channel aligned along the socket driver extension's central cylindrical axis passing through the shaft and the socket driver, the interior channel holding a measurement probe coupled to a measurement indicator on an exterior of the driver extension by a coupling that moves the measurement indicator in proportion to movement of the measurement probe, wherein the coupling comprises a fastener attached to the measurement probe and passing through an opening in the socket driver extension, the fastener coupled to a positioning bracket holding the measurement indicator and configured to slide along an exterior of the socket driver extension; and
   holding the measurement probe against an end of the threaded rod via an opening in the female threaded member while driving the female threaded member with the socket driver; and reading the measurement gauge coupled to an exterior of the socket driver extension that gauges displacement of the measurement indicator without removing the socket driver extension from the female threaded member.

16. The method of claim 15, further comprising tightening the female threaded member until the measurement gauge indicates a desired amount of displacement.

17. The method of claim 15, further comprising loosening the female threaded member if the measurement gauge indicates more than a desired amount of displacement.

18. The method of claim 15, wherein reading the measurement gauge further comprises viewing an electronic display on the gauge unit.

19. The method of claim 15, further comprising transmitting measurement data from the measurement gauge to an independent electronic device using a wireless connection.

* * * * *